US010455257B1

(12) United States Patent
Propst et al.

(10) Patent No.: US 10,455,257 B1
(45) Date of Patent: Oct. 22, 2019

(54) SYSTEM AND CORRESPONDING METHOD FOR FACILITATING APPLICATION OF A DIGITAL VIDEO-EFFECT TO A TEMPORAL PORTION OF A VIDEO SEGMENT

(71) Applicant: Tribune Broadcasting Company, LLC, Chicago, IL (US)

(72) Inventors: Scott Allan Propst, Noblesville, IN (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 14/864,117

(22) Filed: Sep. 24, 2015

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 21/234* | (2011.01) | |
| *H04N 21/2343* | (2011.01) | |
| *H04N 21/262* | (2011.01) | |
| *H04N 21/233* | (2011.01) | |

(Continued)

(52) U.S. Cl.
CPC ..... *H04N 21/23424* (2013.01); *H04N 21/233* (2013.01); *H04N 21/23418* (2013.01); *H04N 21/234345* (2013.01); *H04N 21/26233* (2013.01); *H04N 21/26241* (2013.01); *H04N 21/4316* (2013.01); *H04N 21/8126* (2013.01); *H04N 21/8456* (2013.01)

(58) Field of Classification Search
CPC ............... H04N 21/80; H04N 21/8146; H04N 21/8153; H04N 21/816
See application file for complete search history.

(56) References Cited

U.S. PATENT DOCUMENTS

| 4,459,622 A | * | 7/1984 | Corkery | ................. | G11B 15/44 360/73.05 |
|---|---|---|---|---|---|
| 8,281,339 B1 | | 10/2012 | Walker et al. | | |

(Continued)

FOREIGN PATENT DOCUMENTS

| KR | 1020090002204 A | 1/2009 |
|---|---|---|
| WO | 2015035065 A1 | 3/2015 |
| WO | 2015126991 A1 | 8/2015 |

OTHER PUBLICATIONS

U.S. Appl. No. 14/864,636, filed Sep. 24, 2015.

(Continued)

*Primary Examiner* — Kyu Chae
(74) *Attorney, Agent, or Firm* — McDonnell Boehnen Hulbert & Berghoff LLP

(57) ABSTRACT

In one aspect, an example method for use in a video-broadcast system having a DVE system includes: (i) receiving an instruction to apply a particular DVE of a double-box DVE type to a temporal portion of a video segment based, at least in part, on the temporal portion of the video segment being suitable for having a DVE of the double-box DVE type applied thereto; (ii) making a determination that a particular temporal portion of the video segment has been identified as being suitable for having a DVE of the double-box DVE type applied thereto; and (iii) based, at least in part, on the received instruction and the determination, transmitting to the DVE system an instruction that causes the DVE system to apply the particular DVE to at least part of the particular temporal portion of the video segment.

18 Claims, 5 Drawing Sheets

(51) Int. Cl.
*H04N 21/431* (2011.01)
*H04N 21/81* (2011.01)
*H04N 21/845* (2011.01)

(56) References Cited

U.S. PATENT DOCUMENTS

| | | | |
|---|---|---|---|
| 8,451,380 | B2 | 5/2013 | Zalewski |
| 8,752,113 | B1 | 6/2014 | Good et al. |
| 8,793,728 | B1 | 7/2014 | Hundemer |
| 8,893,169 | B2 | 11/2014 | Klappert et al. |
| 9,049,386 | B1 | 6/2015 | Hundemer |
| 9,094,618 | B1 | 7/2015 | Hundemer |
| 9,473,801 | B1 | 10/2016 | Hundemer |
| 2002/0054244 | A1 | 5/2002 | Holtz et al. |
| 2002/0112249 | A1 | 8/2002 | Hendricks et al. |
| 2003/0192045 | A1 | 10/2003 | Fellenstein et al. |
| 2004/0117819 | A1 | 6/2004 | Yu |
| 2005/0253965 | A1 | 11/2005 | Cooper |
| 2006/0010465 | A1 | 1/2006 | Fellenstein et al. |
| 2008/0016114 | A1 | 1/2008 | Beauregard et al. |
| 2008/0165388 | A1* | 7/2008 | Serlet .......... G11B 27/034 358/448 |
| 2009/0070807 | A1* | 3/2009 | Jacobs .......... H04H 20/103 725/36 |
| 2009/0070837 | A1 | 3/2009 | Jacobs |
| 2009/0144785 | A1* | 6/2009 | Walker .......... G11B 27/034 725/105 |
| 2009/0273715 | A1 | 11/2009 | Casper et al. |
| 2009/0285551 | A1 | 11/2009 | Berry |
| 2010/0169932 | A1 | 7/2010 | Grubb et al. |
| 2011/0173655 | A1 | 7/2011 | Blumenschein et al. |
| 2011/0289531 | A1* | 11/2011 | Moonka .......... G06F 17/30796 725/38 |
| 2012/0011542 | A1 | 1/2012 | Holden |
| 2012/0185905 | A1 | 7/2012 | Kelley |
| 2013/0007815 | A1 | 1/2013 | Jackson et al. |
| 2013/0014157 | A1* | 1/2013 | Harville .......... H04N 5/76 725/32 |
| 2013/0113996 | A1* | 5/2013 | Zhu .......... H04N 5/45 348/565 |
| 2013/0339998 | A1* | 12/2013 | Arme .......... H04N 21/4668 725/32 |
| 2014/0063259 | A1 | 3/2014 | Rhodus et al. |
| 2014/0156364 | A1 | 6/2014 | Zalewski |
| 2014/0282670 | A1 | 9/2014 | Sinha et al. |
| 2014/0359656 | A1 | 12/2014 | Banica et al. |
| 2014/0373044 | A1* | 12/2014 | Carrol .......... H04H 60/06 725/32 |
| 2015/0074535 | A1 | 3/2015 | Silberstein et al. |
| 2015/0139613 | A1* | 5/2015 | Mondelore .......... G11B 27/10 386/280 |
| 2015/0155008 | A1 | 6/2015 | Herberger et al. |
| 2015/0234564 | A1 | 8/2015 | Snibbe et al. |
| 2015/0237415 | A1 | 8/2015 | Hundemer |
| 2015/0264295 | A1 | 9/2015 | Hundemer |
| 2015/0356774 | A1 | 12/2015 | Gal et al. |
| 2016/0316240 | A1 | 10/2016 | Hirsch et al. |
| 2018/0192119 | A1 | 7/2018 | Stigall et al. |
| 2019/0098362 | A1 | 3/2019 | Gutman |

OTHER PUBLICATIONS

U.S. Appl. No. 14/864,641, filed Sep. 24, 2015.
U.S. Appl. No. 14/864,646, filed Sep. 24, 2015.
U.S. Appl. No. 14/864,651, filed Sep. 24, 2015.
Final Office Action dated Feb. 22, 2017, of U.S. Appl. No. 14/864,646, filed Sep. 24, 2015.
Non-final office action dated Jul. 26, 2016 of U.S. Appl. No. 14/864,641, filed Sep. 24, 2015.
Non-Final Office Action dated Oct. 27, 2016, of U.S. Appl. No. 14/864,646, filed Sep. 24, 2015.
International Search Report dated Oct. 11, 2016 issued in connection with International Application No. PCT/US2016/040622, filed on Jul. 1 2016, 5 pages.
Written Opinion of the International Searching Authority dated Oct. 11, 2016 issued in connection with International Application No. PCT/US2016/040622, filed on Jul. 1 2016, 9 pages.
International Search Report dated Oct. 7, 2016 issued in connection with International Application No. PCT/US2016/040623, filed on Jul. 1, 2016, 3 pages.
Written Opinion of the International Searching Authority dated Oct. 7, 2016 issued in connection with International Application No. PCT/US2016/040623, filed on Jul. 1, 2016, 6 pages.
International Search Report dated Sep. 12, 2016 issued in connection with International Application No. PCT/US2016/040624, filed on Jul. 1, 2016, 3 pages.
Written Opinion of the International Searching Authority dated Sep. 12, 2016 issued in connection with International Application No. PCT/US2016/040624, filed on Jul. 1, 2016, 8 pages.
Non-Final Office Action dated Nov. 16, 2016, of U.S. Appl. No. 14/864,651, filed Sep. 24, 2015.
Non-Final Office Action dated Jun. 5, 2017, of U.S. Appl. No. 14/864,636, filed Sep. 24, 2015.
Advisory Action dated Jul. 5, 2017, of U.S. Appl. No. 14/864,646, filed Sep. 24, 2015.
Notice of Allowance dated Sep. 13, 2017, of U.S. Appl. No. 14/864,641 filed Sep. 24, 2015.
Final Office Action dated Mar. 8, 2017, of U.S. Appl. No. 14/864,641, filed Sep. 24, 2015.
Final Office Action dated Jul. 26, 2017, of U.S. Appl. No. 14/864,651, filed Sep. 24, 2015.
Office Action dated May 1, 2018, of U.S. Appl. No. 15/840,862, filed Dec. 13, 2017.
Advisory Action dated May 15, 2018, of U.S. Appl. No. 14/864,636, filed Sep. 24, 2015.
Office Action dated Dec. 13, 2017, of U.S. Appl. No. 14/864,651, filed Sep. 24, 2015.
U.S. Appl. No. 15/840,862, filed Dec. 13, 2017.
Office Action dated Jan. 19, 2018, of U.S. Appl. No. 14/864,636, filed Sep. 24, 2015.
Final Office Action dated Sep. 5, 2018, of U.S. Appl. No. 14/864,651, filed Sep. 24, 2015.
Office Action dated Jan. 10, 2019, of U.S. Appl. No. 15/840,862, filed Dec. 13, 2017.
Office Action dated Dec. 21, 2018, of U.S. Appl. No. 14/864,636, filed Sep. 24, 2015.
Office Action dated Jun. 5, 2019, of U.S. Appl. No. 14/864,651, filed Sep. 24, 2015.
Notice of Allowance dated Jul. 16, 2019, of U.S. Appl. No. 15/840,862, filed Dec. 13, 2017.
Final Office Action dated Aug. 26, 2019, of U.S. Appl. No. 14/864,636, filed Sep. 24, 2015.

* cited by examiner

… (1)

SYSTEM AND CORRESPONDING METHOD FOR FACILITATING APPLICATION OF A DIGITAL VIDEO-EFFECT TO A TEMPORAL PORTION OF A VIDEO SEGMENT

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A video-broadcast system may be configured to generate and broadcast a video stream to a set of receivers (e.g., set-top boxes) for viewing by end-users. The system may include multiple components for generating the video stream. For example, the system may include a digital video-effect (DVE) system, which may apply a DVE to a video segment represented by a video stream. This may result in the DVE system modifying the video segment and generating a new video stream that represents the modified video segment.

SUMMARY

In a first aspect, an example method for use in a video-broadcast system having a DVE system is disclosed. The method includes: (i) receiving an instruction to apply a particular DVE of a double-box DVE type to a temporal portion of a video segment based, at least in part, on the temporal portion of the video segment being suitable for having a DVE of the double-box DVE type applied thereto; (ii) making a determination that a particular temporal portion of the video segment has been identified as being suitable for having a DVE of the double-box DVE type applied thereto; and (iii) based, at least in part, on the received instruction and the determination, transmitting to the DVE system an instruction that causes the DVE system to apply the particular DVE to at least part of the particular temporal portion of the video segment.

In a second aspect, a non-transitory computer-readable medium has stored thereon program instructions that when executed cause performance of a set of acts including: (i) receiving an instruction to apply a particular DVE of a double-box DVE type to a temporal portion of a video segment based, at least in part, on the temporal portion of the video segment being suitable for having a DVE of the double-box DVE type applied thereto; (ii) making a determination that a particular temporal portion of the video segment has been identified as being suitable for having a DVE of the double-box DVE type applied thereto; and (iii) based, at least in part, on the received instruction and the determination, transmitting to the DVE system an instruction that causes the DVE system to apply the particular DVE to at least part of the particular temporal portion of the video segment.

In a third aspect, a video-broadcast system includes an automation system; a communication network; and a DVE system connected to the automation system via the communication network, wherein the automation system is configured for performing a set of acts including: (i) receiving an instruction to apply a particular DVE of a double-box DVE type to a temporal portion of a video segment based, at least in part, on the temporal portion of the video segment being suitable for having a DVE of the double-box DVE type applied thereto; (ii) making a determination that a particular temporal portion of the video segment has been identified as being suitable for having a DVE of the double-box DVE type applied thereto; and (iii) based, at least in part, on the received instruction and the determination, transmitting to the DVE system an instruction that causes the DVE system to apply the particular DVE to at least part of the particular temporal portion of the video segment.

DETAILED DESCRIPTION

I. Overview

Figure 1:
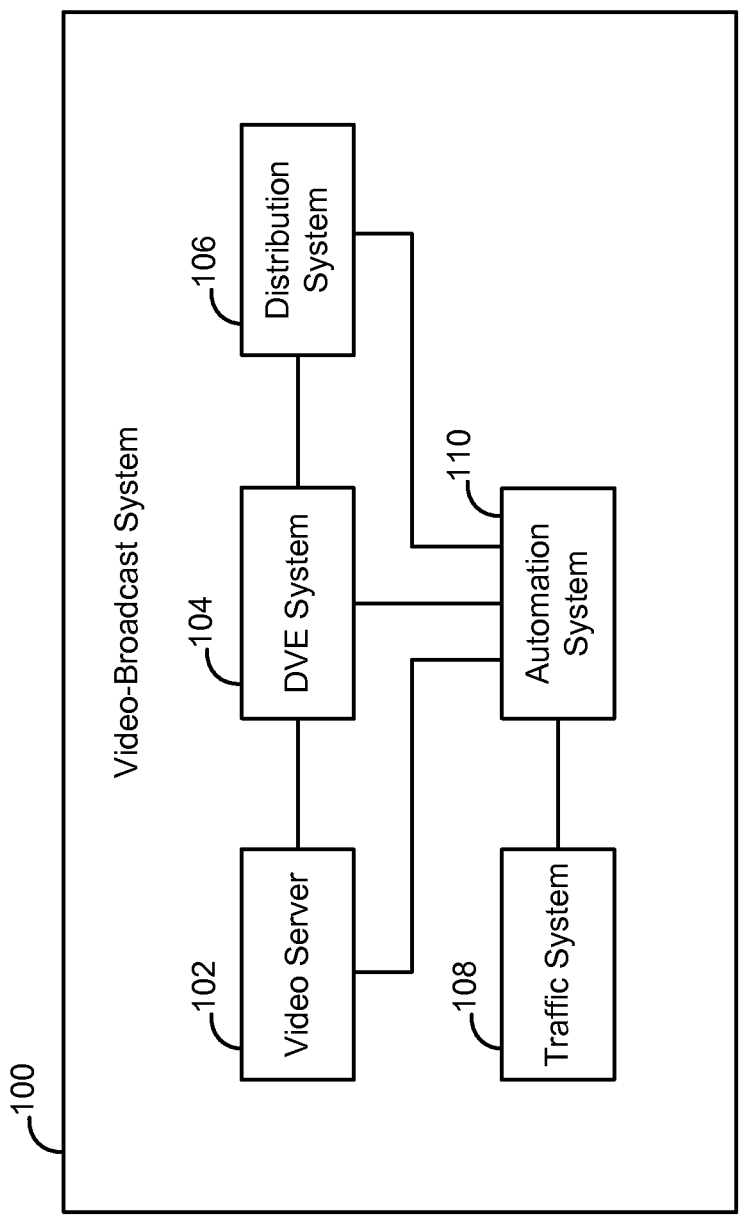
FIG. 1 is a simplified block diagram illustrating an example system.

The following detailed description describes various features, acts and/or functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

As indicated above, a DVE system may apply a DVE to a video segment. There are various types of DVEs, one example of which is a double-box DVE. A double-box DVE is a DVE in which, when the DVE is applied to a video segment, first content of the video segment is scaled down in size (i.e., "pulled back"), and positioned in a first window (sometimes referred to in the industry—and referred to herein—as a "box"), and second content of another video segment is positioned in a second box, such that the first content and the second content may be shown simultaneously. In some instances, the second content may then be scaled up and may take over as full screen content. As such, the double-DVE may be used to facilitate a transition between the first and second content.

In one example, a DVE system applying a double-box DVE may allow for first content representing the end of a television show and second content representing the start of a next scheduled television show to be shown simultaneously for a brief period. Thereafter, the second content may be increased in size and take over as full screen content. Also, at some point during the transition, there may be a switch over of audio content. That is, the "active" audio content may switch from audio content corresponding to the first television show to audio content corresponding to the second television show. Notably, this is just one example of how a particular double-box DVE may be configured. A double-box DVE may be configured in various other ways as well.

In some instances, an applied double-box DVE may cause an undesirable experience for a viewer. For example, the viewer may find it distracting to have content of the video segment reduced in size when the viewer is focusing on that content. In some instances though, such as where the viewer is not particularly focused on the content, reducing the size of the content may not be distracting (or may be less distracting) to the viewer. This may be the case, for example, where the content is a portion of the video segment that shows attribution credits (e.g., the ending credits of a movie) and/or where this is the case and where audio content corresponding to the video content has a particular property, which may suggests that the viewer is unlikely to be closely paying attention to the content. The present disclosure provides a way to help facilitate the application of a double-box DVE while reducing that chance of causing an undesirable experience for a viewer.

According to the present disclosure, an example method includes an automation system receiving an instruction to apply a particular DVE of a double-box DVE type to a temporal portion of a video segment, based, at least in part, on the temporal portion of the video segment being suitable for having a DVE of the double-box DVE type applied thereto. In one example, the act of receiving the instruction may include receiving a portion of a traffic schedule associated with a video-broadcast system, and extracting the instruction from the received portion of the traffic schedule.

Further, the method may include the automation system making a determination that a particular temporal portion of the video segment has been identified as being suitable for having a DVE of the double-box DVE type applied thereto. In one instance, the act of making the determination may be based on an input received via a user interface. In this instance, a user may determine that the particular temporal portion of the video segment is suitable for having a DVE of the double-box DVE type applied thereto, perhaps based on the particular temporal portion of the video segment including attribution credits. The user may then use the user interface to facilitate marking the particular temporal portion as being suitable for having a DVE of the particular double-box DVE type applied thereto.

Still further, the method may include, based, at least in part, on the received instruction and the determination, the automation system transmitting to the DVE system an instruction that causes the DVE system to apply the particular DVE to at least part of the particular temporal portion of the video segment. This may result in the automation system applying the particular DVE to a suitable temporal-portion (and not to an unsuitable temporal-portion) of the video segment, thereby reducing the chance of the viewer having an undesirable experience.

II. Example System

FIG. 1 is a simplified block diagram illustrating an example video-broadcast system 100. The video-broadcast system 100 may take a variety of forms, such as that of a television-broadcast system. The video-broadcast system 100 may include a video server 102, a DVE system 104, a distribution system 106, a traffic system 108, and an automation system 110.

The systems and devices of the video-broadcast system 100 may be connected in various ways. For example, the DVE system 104 may be connected to the video server 102 and the distribution system 106. And the automation system 110 may be connected to the video server 102, the DVE system 104, the distribution system 106, and the traffic system 108.

Each connection described in this disclosure may be a direct connection or an indirect connection, the latter being a connection that passes through or traverses one or more devices, such as a router, switcher, or other network device.

The video server 102 may be configured to load a video asset. This may involve the video server 102 retrieving from a data storage unit a file representing the video asset. The video server 102 may also be configured to playout the video asset. This may involve the video server 102 converting a retrieved file into a video stream and outputting the video stream. In one example, the video server 102 may transmit the video stream to the DVE system 104.

The DVE system 104 may be configured to perform various functions related to DVEs. For example, the DVE system 104 may be configured to receive a video stream representing a video segment and apply a DVE to the video segment. This may result in the DVE system 104 modifying the video segment and generating a new video stream that represents the modified video segment. The DVE system 104 may further be configured for outputting the generated video stream. In one example, the DVE system 104 may transmit the generated video stream to the distribution system 106.

The DVE system 104 may take various forms, such as that of a stunt switcher. An example of a stunt switcher is the Miranda NVISION NVS5100MC provided by NVision, Inc. of Coppell, Tex.

Figure 5A:
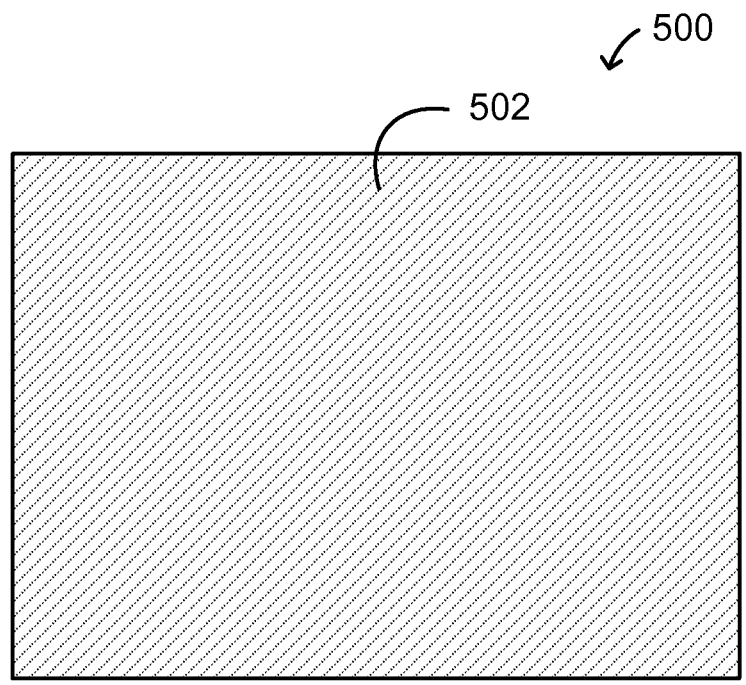
FIG. 5A is a simplified illustration of a frame of a first portion of an example video segment before a double-box DVE has been applied.
Figure 5B:
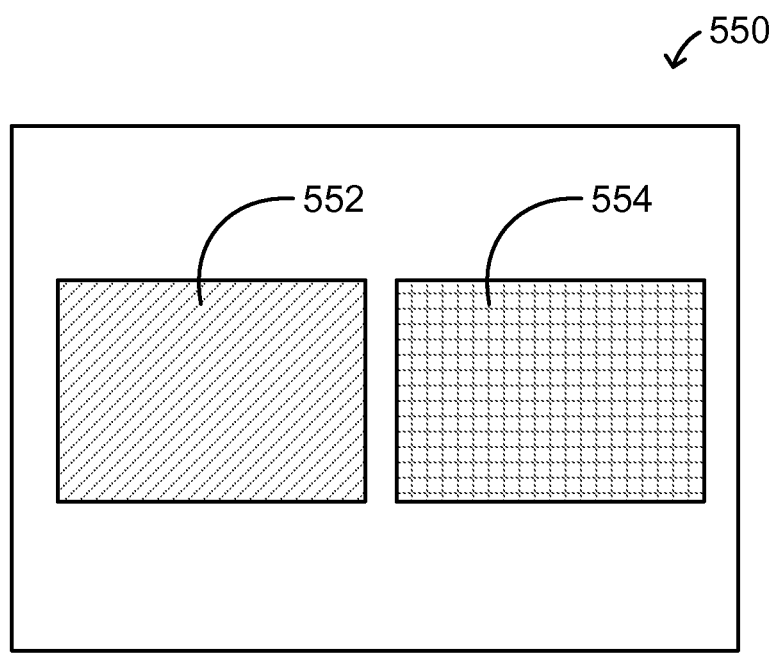
FIG. 5B is a simplified illustration of a frame of a second portion of the example video segment of FIG. 5A after a double-box DVE has been applied.

There are various types of DVEs, one example of which is a double-box DVE. FIGS. 5A and 5B help illustrate the concept of applying a double-box DVE to a portion of a video segment. FIG. 5A is a simplified diagram of a frame 500 of a first portion of an example video segment. The frame 500 includes content 502. For comparison, FIG. 5B is a simplified diagram of a frame 550 of the example video segment. The frame 550 includes content 552, which is a scaled down version of the content 502 such that it is shown in a first box. As shown, content 554 is also shown, but in a second box. As such, in this example, applying the double-box DVE results in content 552 and content 554 being shown simultaneously. At some point, content 554 may then take over as full screen content to complete the transition.

The DVE system 104 may also be configured to assist a user in designing a DVE. For example, a user may design a double-box DVE by specifying scaling parameters of content, what select content should be, and/or where on a frame the content should be shown.

While or after a DVE is designed, the DVE system 104 may generate and store a corresponding set of instructions into a data storage unit. To apply the DVE to video content, the DVE system 104 may then retrieve and execute the corresponding set of instructions. In one example, this may cause the DVE system 104 to use one or more layers known as "keys" to modify the video content such that the DVE system 104 can generate a video stream representing the modified video content.

In some instances, a double-box DVE may have a specified duration. In such cases, the DVE system 104 may automatically stop applying the double-box DVE after the specified duration has lapsed.

Another example type of DVE is a removal DVE. A removal DVE may be configured to remove an applied double-box DVE. In one example, the removal DVE may simply "reset" all keys such that no other effects remain; thereby ensuring that any double-box DVE is removed. In some instances, a double-box DVE may not have a specified duration. In such cases, the DVE system 104 may apply to a removal DVE at a desired time to stop the double-box DVE from being applied.

In some instances, the DVE system 104 may also store in a data storage unit content intended to be used in connection with a double-box DVE. In other instances, the DVE system 104 may receive such content (e.g., from the video server 102) as the DVE is being applied.

As used throughout this disclosure, the term broadcast means the distribution of media (e.g., audio, video, or a combination thereof) via any means. As such, the distribution system 106 may be configured to distribute a video stream to an end-user device via any means for presentation to an end-user. In practice, the distribution system 106 may distribute a video stream to a mass number of end-user devices for presentation to a mass number of end-users. The distribution system 106 may include various systems or components, such as a terrestrial antenna or a satellite, and may be configured for distributing the video stream to the end-user device in a variety of ways. For example, the distribution system 106 may distribute the video stream over-the-air or via a packet-based network such as the Internet. The end-user device may take a variety of forms, such as that of a television, a television set-top box, or a computing device. The traffic system 108 may be configured to perform operations related to broadcast scheduling. For example, the traffic system 108 may be configured to facilitate the creation and modification of a traffic schedule, and to output the traffic schedule. A traffic schedule is a schedule of broadcast-related events, typically for a particular channel or station. A traffic schedule is sometimes referred to in the broadcast industry as a traffic log. An example of the traffic system 108 is Wide Orbit Traffic provided by Wide Orbit Inc. of San Francisco, Calif. In one example, the traffic system 108 may transmit a traffic schedule to the automation system 110.

The automation system 110 may be configured to perform operations related to broadcast scheduling and sequencing. For example, the automation system 110 may be configured to receive a traffic schedule from the traffic system 108, and to modify the traffic schedule, such as by adding information to it. For example, where a record of the traffic schedule indicates that a particular video segment has been scheduled, the automation system 110 may add to that record an indication of a particular video server assigned to load and playout that video segment. In practice, the automation system 110 may modify multiple records of the traffic schedule in this manner. A traffic schedule that has been modified with this additional information is sometimes referred to in the broadcast industry as a playlist.

The automation system 110 may also be configured to control one or more systems or devices. In one example, the automation system 110 may traverse records of a traffic schedule, and control systems or devices based on the entries in those traversed records. The automation system 110 may control a system or device in various ways, such as by transmitting a suitable instruction to the system or device.

In one example, the automation system 110 may be configured to control one or more systems or devices of the video-broadcast system 100, such as the DVE system 104. By way of example, the automation system 110 may transmit to the DVE system 104 an instruction that causes the DVE system 104 to apply a particular double-box DVE to a temporal portion of a video segment.

In some examples, the video-broadcast system 100 may be integrated with an audio-broadcast system, such that a video stream representing video content may be broadcast together with an audio stream representing corresponding audio content. In some instances, the video stream and the audio stream may be combined into a single media stream.

Figure 2:
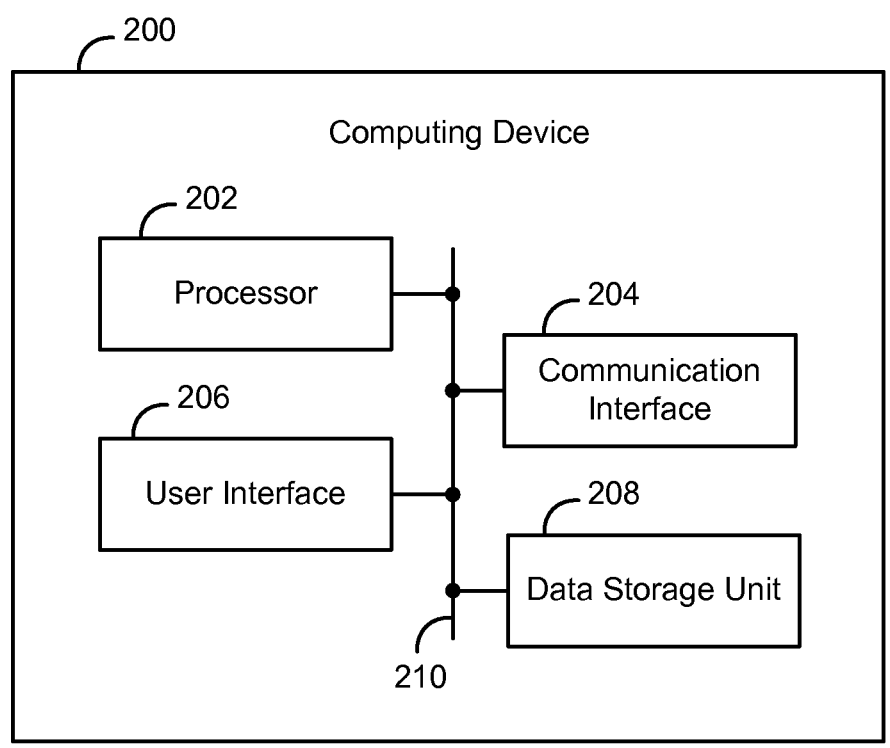
FIG. 2 is a simplified block diagram illustrating an example computing device.

FIG. 2 is a simplified block diagram illustrating an example computing device 200. The device 200 may be configured for performing a variety of functions or acts, such as those described in this disclosure (including the accompanying drawings). The device 200 may include various components, including for example, a processor 202, a communication interface 204, a user interface 206, and a data storage unit 208. The components of the device 200 may be communicatively connected to each other (or other devices or systems) via a system bus, network, or other connection mechanism 210.

The processor 202 may include a general purpose processor (e.g., a microprocessor) and/or a special purpose processor (e.g., a digital signal processor (DSP)).

The communication interface 204 may be configured to allow the device 200 to communicate with one or more devices or systems according to one or more protocols. In one example, the communication interface 204 may be a wired interface, such as an Ethernet interface or a high-definition serial-digital-interface (HD-SDI). As another example, the communication interface 204 may be a wireless interface, such as a cellular or WI-FI interface.

The user interface 206 may facilitate interaction with a user of the device, if applicable. As such, the user interface 206 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. In one example, the device 200 may receive, via the user interface 206, input that may be used to design a DVE, or to mark a temporal portion of a video segment as being suitable for having a DVE of a DVE double-box type applied thereto.

The data storage unit 208 may include one or more volatile, non-volatile, removable, and/or non-removable storage components, such as magnetic, optical, or flash storage, and may be integrated in whole or in part with the processor 202. Further, the data storage unit 208 may take the form of a non-transitory computer-readable storage medium, having stored thereon program instructions (e.g., compiled or non-compiled program logic and/or machine code) that, when executed by the processor 202, cause the device 200 to perform one or more functions or acts, such as those described in this disclosure. Such program instructions may define or be part of a discrete software application that can be executed in response to certain input received via user interface 206, for instance. The data storage unit 208 may also store other types of information or data, such as those types described throughout this disclosure.

III. Example Operations

Figure 3:
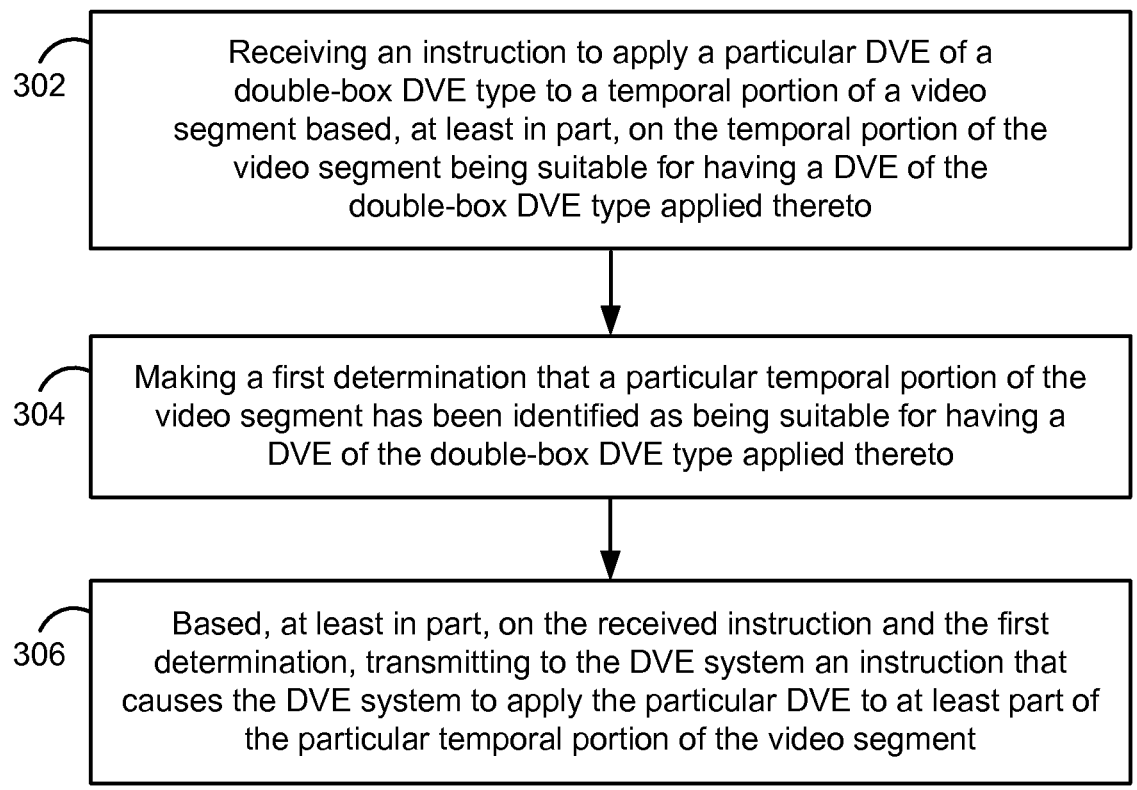
FIG. 3 is a flow chart illustrating an example method.

FIG. 3 is a flow chart illustrating an example method 300. The method 300 may be used in connection with a system including an automation system, a communication network, and a DVE system. In one example, the method 300 may be used in connection with the system 100.

At block 302, the method may include receiving an instruction to apply a particular DVE of a double-box DVE type to a temporal portion of a video segment based, at least in part, on the temporal portion of the video segment being suitable for having a DVE of the double-box DVE type applied thereto. For instance, the method may include the automation system 110 receiving such an instruction. In one example, this may include the automation system 110 receiving a portion of a traffic schedule from the traffic system 108, and extracting the instruction from the received portion of the traffic schedule.

At block 304, the method may include making a determination that a particular temporal portion of the video segment has been identified as being suitable for having a DVE of the double-box DVE type applied thereto. For instance, the method may include the automation system 110 making such a determination, which it may do in a variety of ways.

In one scenario, via a user interface of a computing device, a user may watch or scan through a video segment, and mark one or more temporal portions of the video segment that the user identifies as being suitable for having a DVE of the double-box DVE type applied thereto.

The user may identify such temporal portions based on the temporal portions of the video segment having a particular characteristic. For example, the user may identify such temporal portions based on the temporal portions of the video segment including content that includes attribution credits. In another example, the user may identify such temporal portions based on audio content corresponding to the temporal portions of the video segment including music and/or not including spoken dialog. In the case where video content includes attribution credits and music, but not spoken dialog, a viewer may be less likely to be focused on the video content.

In another scenario, the computing device may employ a suitable algorithm to automatically detect and mark one or more temporal portions of the video segment that are suitable for having a DVE of the double-box DVE type applied thereto, again perhaps based on the temporal portions of the video segment (or corresponding audio content) having a particular property, such as those discussed above.

As such, the method may include the automation system 110 identifying the particular temporal portion of the video segment as being suitable for having a DVE of the double-box DVE type applied thereto, which itself may include the automation system 110 (i) detecting that video content of the particular temporal portion of the video segment includes attribution credits, and/or (ii) detecting that audio content corresponding to the video content has a particular property.

In one example, the automation system 110 may detect that video content includes attribution credits by analyzing one or more frames of the video segment and detecting certain frame properties (e.g., properties that indicate that white text is being shown on a black background). Also, in one example, the automation system 110 may detect whether audio content includes music or spoken dialog by analyzing the audio using a suitable automated content recognition technique.

In either scenario, the computing device may then store data representing these markings, perhaps as video segment metadata, and the automation system 110 may retrieve and use this data to make the first determination that the particular temporal portion of the video segment has been identified as being suitable for having a DVE of the double-box DVE type applied thereto.

Figure 4:
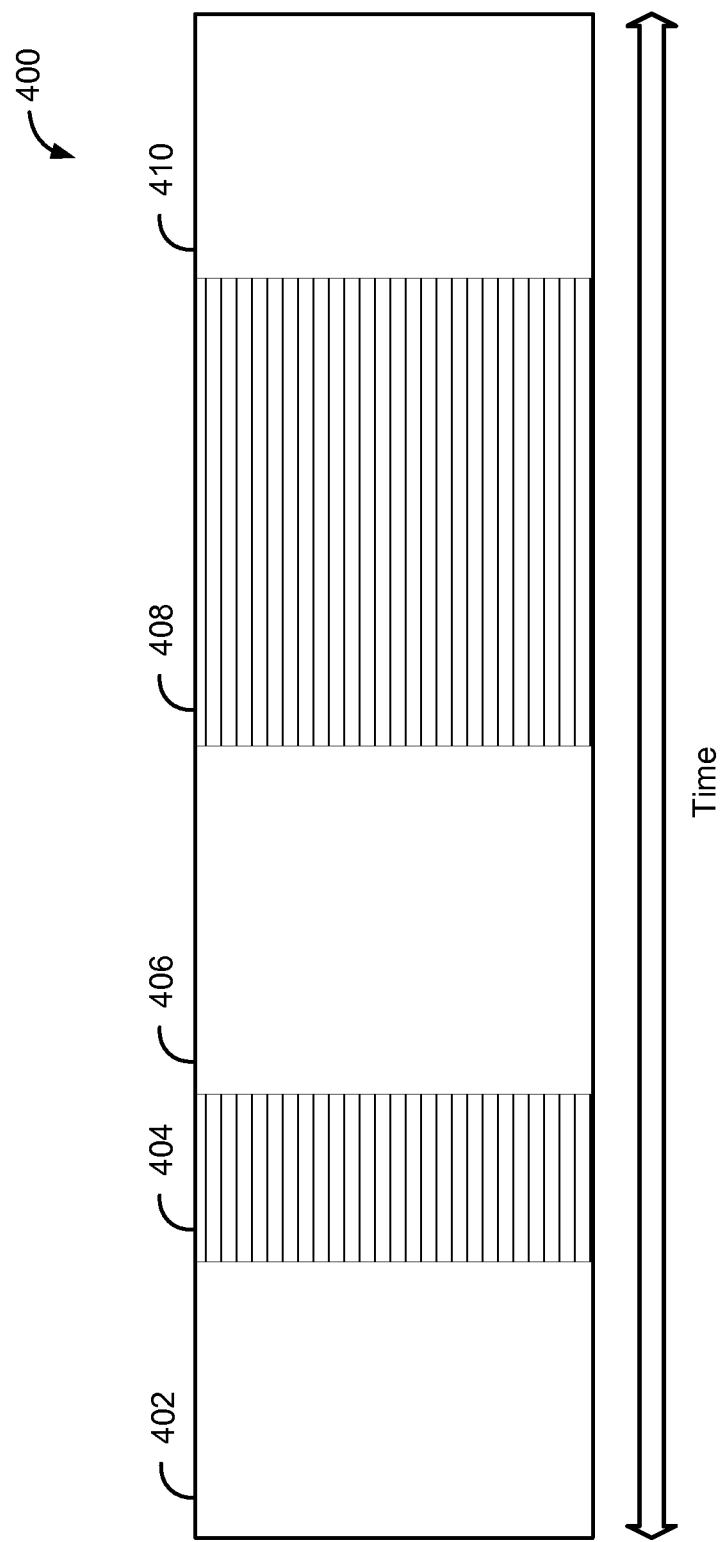
FIG. 4 is a simplified diagram illustrating a timeline representation of an example video segment.

To help illustrate this concept, consider FIG. 4, which is a simplified diagram illustrating a timeline representation of an example video segment 400. The video segment 400 may include one or more temporal portions 402, 406, and 410 that are unsuitable for having a DVE of a double-box DVE type applied thereto. The video segment 400 may also include temporal portions 404 and 408 that are suitable for having a DVE of the double-box DVE type applied thereto, and which the automation system 110 has identified as such.

At block 306, the method may include based, at least in part, on the received instruction and the first determination, transmitting to the DVE system an instruction that causes the DVE system to apply the particular DVE to at least part of the particular temporal portion of the video segment. For instance, this may involve, based, at least in part, on the received instruction and the first determination, the automation system 110 transmitting such an instruction to the DVE system 104. As a result, the DVE system 104 may apply the particular DVE to at least part of the particular temporal portion of the video segment.

Accordingly, the automation system 110 may cause the DVE system 104 to apply the particular DVE to at least a part of the temporal portion 404 and/or at least a part of the temporal portion 408.

Referring back to the act at block 302, in some examples, the received instruction may provide additional details relating to the manner in which the particular DVE should be applied to a suitable temporal portion of the video segment. For example, the instruction may be an instruction to apply the particular DVE to exactly one suitable temporal portion of the video segment, namely the one that is nearest in time. As another example, the instruction may be an instruction to apply the particular DVE to all of the suitable temporal portions of the video segment.

Further, for a given suitable temporal portion, the instruction may be an instruction to apply the particular DVE to the entire temporal portion of the video segment. As such, the automation system 110 may transmit to the DVE system 104 an instruction that causes the DVE system 104 to, proximate a starting time of the particular temporal portion of the video segment, apply the particular DVE to the particular temporal portion of the video segment. Alternatively, the instruction may be an instruction to apply the particular DVE to less than the entire temporal portion of the video segment (e.g. to a subset spanning from a starting point five seconds after the temporal portion begins to an ending point five seconds before the temporal portion begins).

In another example, the received instruction may be an instruction to apply a particular DVE of a double-box DVE type to a temporal portion of a video segment based, at least in a part, on (i) the temporal portion of the video segment being suitable for having a DVE of the double-box DVE type applied thereto and (ii) the temporal portion of the video segment having at least a threshold duration.

In another example, the received instruction may be an instruction to apply a particular DVE of a double-box DVE type to a temporal portion of a video segment based, at least in a part, on (i) the temporal portion of the video segment being suitable for having a DVE of the double-box DVE type applied thereto, (ii) the temporal portion of the video segment having at least a threshold duration, and (iii) the temporal portion of the video segment being a next scheduled video segment that is suitable for having a DVE of the double-box DVE type applied thereto.

Depending on the nature of the received instruction, the automation system 110 may perform additional acts and/or the act at block 306 may vary, as appropriate. For example, where the received instruction related to a threshold duration as noted above, the automation system 110 may determine a duration of the particular temporal portion. In this case, the act at block 306 may include based, at least in part, on the received instruction, the first determination, and the determined duration, transmitting to the DVE system the instruction.

As another example, where the received instruction relates to a threshold duration and to an attribute of a next scheduled video segment as noted above, the automation system 110 may make a second determination that the particular temporal portion of the video segment is, according to a particular traffic schedule, a next scheduled video segment that (i) has been identified as being suitable for having a DVE of the double-box DVE type applied thereto and (ii) has at least the threshold duration. In this case, the act at block 306 may include based, at least in part, on the received instruction, the first determination, the determined duration, and the second determination, transmitting to the DVE system the instruction.

IV. Example Variations

While one or more acts have been described as being performed by certain devices, systems, or entities (e.g., the computing device 200), the acts may be performed by any device, system, or entity, such as those described in connection with the video-broadcast system 100. For example, in some instances, the described acts may be performed by a television, set-top box, or other device, system or entity at the viewer's end, rather than by one or more components of a video-broadcast system. Furthermore, the devices and systems need not be discrete entities. Some or all of the devices or systems may be combined into a single device or system, or otherwise arranged.

In addition, the acts described herein need not be performed in the disclosed order, although in some examples an order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the broader aspects of the invention as set forth in the following claims.

The invention claimed is:

1. A method for use in a video-broadcast system having a digital video-effect (DVE) system, the method comprising:
   receiving an instruction to apply a particular DVE of a double-box DVE type to a non-particular temporal portion of a video segment based, at least in part, on the temporal portion of the video segment being suitable for having a DVE of the double-box DVE type applied thereto, wherein the non-particular temporal portion of the video segment is less than the entire video segment, wherein receiving the instruction comprises (i) receiving a portion of a traffic schedule generated by a traffic system, wherein the traffic schedule is a schedule of broadcast-related events for a particular channel or station, and (ii) extracting the instruction from the received portion of the traffic schedule;
   making a determination that a particular temporal portion of the video segment has been identified as being suitable for having a DVE of the double-box DVE type applied thereto; and
   based, at least in part, on the received instruction and the determination, transmitting to the DVE system an instruction that causes the DVE system to apply the particular DVE to at least part of the particular temporal portion of the video segment.

2. The method of claim 1, wherein receiving the instruction comprises receiving an instruction to apply the particular DVE of the double-box DVE type to a temporal portion of a video segment based, at least in a part, on (i) the temporal portion of the video segment being suitable for having a DVE of the double-box DVE type applied thereto and (ii) the temporal portion of the video segment having at least a threshold duration, the method further comprising:
   determining a duration of the particular temporal portion, wherein based, at least in part, on the received instruction and the determination, transmitting to the DVE system the instruction comprises, based, at least in part, on the received instruction, the determination, and the determined duration, transmitting to the DVE system the instruction.

3. The method of claim 2, wherein the determination is a first determination, wherein receiving the instruction comprises receiving an instruction to apply the particular DVE to a temporal portion of a video segment based, at least in a part, on (i) the temporal portion of the video segment being suitable for having a DVE of the double-box DVE type applied thereto, (ii) the temporal portion of the video segment having at least a threshold duration, and (iii) the temporal portion of the video segment being, according to the traffic schedule, a next scheduled video segment that (a) is suitable for having a DVE of the double-box DVE type applied thereto and (b) has at least the threshold duration, the method further comprising:
   making a second determination that the particular temporal portion of the video segment is, according to a particular traffic schedule, a next scheduled video segment that (i) has been identified as being suitable for having a DVE of the double-box DVE type applied thereto and (ii) has at least the threshold duration, wherein based, at least in part, on the received instruction, the first determination, and the determined duration, transmitting to the DVE system the instruction comprises, based, at least in part, on the received instruction, the first determination, the determined duration, and the second determination, transmitting to the DVE system the instruction.

4. The method of claim 1, wherein making the determination comprises making the determination based on input received via a user interface.

5. The method of claim 1, further comprising:
   identifying the particular temporal portion of the video segment as being suitable for having a DVE of the double-box DVE type applied thereto, wherein identifying the particular temporal portion of the video segment as being suitable for having a DVE of the double-box DVE type applied thereto comprises (i) detecting that video content of the particular temporal portion of the video segment includes attribution credits and (ii) detecting that audio content corresponding to the video content has a particular property.

6. The method of claim 5, wherein detecting that audio content corresponding to the video content has the particular property comprise detecting that the audio content does not include spoken dialog.

7. The method of claim 5, wherein detecting that audio content corresponding to the video content has the particular property comprise detecting that the audio content includes music.

8. The method of claim 1, wherein transmitting to the DVE system the instruction comprises transmitting to the DVE system an instruction that causes the DVE system to, proximate a starting time of the particular temporal portion of the video segment, apply the particular DVE to the particular temporal portion of the video segment.

9. The method of claim 1, wherein the DVE system comprises a stunt switcher.

10. A non-transitory computer-readable medium having stored thereon program instructions that when executed cause performance of a set of acts comprising:
receiving an instruction to apply a particular DVE of a double-box DVE type to a non-particular temporal portion of a video segment based, at least in part, on the temporal portion of the video segment being suitable for having a DVE of the double-box DVE type applied thereto, wherein the non-particular temporal portion of the video segment is less than the entire video segment, wherein receiving the instruction comprises (i) receiving a portion of a traffic schedule generated by a traffic system, wherein the traffic schedule is a schedule of broadcast-related events for a particular channel or station, and (ii) extracting the instruction from the received portion of the traffic schedule;
making a determination that a particular temporal portion of the video segment has been identified as being suitable for having a DVE of the double-box DVE type applied thereto; and
based, at least in part, on the received instruction and the determination, transmitting to a DVE system an instruction that causes the DVE system to apply the particular DVE to at least part of the particular temporal portion of the video segment.

11. The non-transitory computer-readable medium of claim 10, wherein receiving the instruction comprises receiving an instruction to apply the particular DVE of a particular double-box DVE type to a temporal portion of a video segment based, at least in a part, on (i) the temporal portion of the video segment being suitable for having a DVE of the double-box DVE type applied thereto and (ii) the temporal portion of the video segment having at least a threshold duration, the set of acts further comprising:
determining a duration of the particular temporal portion, wherein based, at least in part, on the received instruction and the determination, transmitting to the DVE system the instruction comprises, based, at least in part, on the received instruction, the determination, and the determined duration, transmitting to the DVE system the instruction.

12. The non-transitory computer-readable medium of claim 11, wherein the determination is a first determination, wherein receiving the instruction comprises receiving an instruction to apply the particular DVE to a temporal portion of a video segment based, at least in a part, on (i) the temporal portion of the video segment being suitable for having a DVE of the double-box DVE type applied thereto, (ii) the temporal portion of the video segment having at least a threshold duration, and (iii) the temporal portion of the video segment being, according to the traffic schedule, a next scheduled video segment that (a) is suitable for having a DVE of the double-box DVE type applied thereto and (b) has at least the threshold duration, the set of acts further comprising:
making a second determination that the particular temporal portion of the video segment is, according to a particular traffic schedule, a next scheduled video segment that (i) has been identified as being suitable for having a DVE of the double-box DVE type applied thereto and (ii) has at least the threshold duration, wherein based, at least in part, on the received instruction, the first determination, and the determined duration, transmitting to the DVE system the instruction comprises, based, at least in part, on the received instruction, the first determination, the determined duration, and the second determination, transmitting to the DVE system the instruction.

13. The non-transitory computer-readable medium of claim 10, wherein making the determination comprises making the determination based on input received via a user interface.

14. The non-transitory computer-readable medium of claim 10, the set of acts further comprising:
identifying the particular temporal portion of the video segment as being suitable for having a DVE of the double-box DVE type applied thereto, wherein identifying the particular temporal portion of the video segment as being suitable for having a DVE of the double-box DVE type applied thereto comprises (i) detecting that video content of the particular temporal portion of the video segment includes attribution credits and (ii) detecting that audio content corresponding to the video content has a particular property.

15. The non-transitory computer-readable medium of claim 14, wherein detecting that audio content corresponding to the video content has the particular property comprise detecting that the audio content does not include spoken dialog.

16. The non-transitory computer-readable medium of claim 14, wherein detecting that audio content corresponding to the video content has the particular property comprise detecting that the audio content includes music.

17. The non-transitory computer-readable medium of claim 10, wherein transmitting to the DVE system the instruction comprises transmitting to the DVE system an instruction that causes the DVE system to, proximate a starting time of the particular temporal portion of the video segment, apply the particular DVE to the particular temporal portion of the video segment.

18. A video-broadcast system comprising:
an automation system;
a communication network; and
a digital video-effect (DVE) system connected to the automation system via the communication network, wherein the automation system is configured for performing a set of acts comprising:
receiving an instruction to apply a particular DVE of a double-box DVE type to a non-particular temporal portion of a video segment based, at least in part, on the temporal portion of the video segment being suitable for having a DVE of the double-box DVE type applied thereto, wherein the non-particular temporal portion of the video segment is less than the entire video segment, wherein receiving the instruction comprises (i) receiving a portion of a traffic schedule generated by a traffic system, wherein the traffic schedule is a schedule of broadcast-related events for a particular channel or station, and (ii) extracting the instruction from the received portion of the traffic schedule;

making a determination that a particular temporal portion of the video segment has been identified as being suitable for having a DVE of the double-box DVE type applied thereto; and based, at least in part, on the received instruction and the determination, transmitting to the DVE system an instruction that causes the DVE system to apply the particular DVE to at least part of the particular temporal portion of the video segment.

\* \* \* \* \*